United States Patent [19]
Soares et al.

[11] Patent Number: 6,062,103
[45] Date of Patent: May 16, 2000

[54] MOTOR VEHICLE DOUBLE DAMPING FLYWHEEL, COMPRISING IMPROVED MEANS FOR FRICTION DAMPING OF VIBRATIONS

[75] Inventors: Cesario Soares, Fresnay le Gilmert; Patrice Bertin, Mery-sur-Oise; Christophe Tardiveau, Paris, all of France

[73] Assignee: Valeo, Paris, France

[21] Appl. No.: 09/068,940
[22] PCT Filed: Sep. 30, 1997
[86] PCT No.: PCT/FR97/01724
§ 371 Date: May 21, 1998
§ 102(e) Date: May 21, 1998
[87] PCT Pub. No.: WO98/14719
PCT Pub. Date: Apr. 9, 1998

[30] Foreign Application Priority Data

Sep. 30, 1996 [FR] France .................................. 96 12098

[51] Int. Cl.⁷ .............................. G05G 1/00; F16F 15/10; F16F 15/22
[52] U.S. Cl. .............................. 74/574; 464/68; 192/214; 192/70.17; 74/572
[58] Field of Search ................. 74/572–574; 192/70.17, 192/214, 113.23, 113.4, 214.1; 464/17, 68, 62

[56] References Cited

U.S. PATENT DOCUMENTS

| | | |
|---|---|---|
| 4,724,719 | 2/1988 | Werner et al. .................... 464/68 X |
| 4,932,286 | 6/1990 | Fukishima . |
| 5,135,092 | 8/1992 | Jackel . |
| 5,788,043 | 8/1998 | Feigler et al. ..................... 192/214 |
| 5,797,297 | 8/1998 | Mokdad ................................ 74/574 |
| 5,826,689 | 10/1998 | Bochot ............................. 192/70.17 |

FOREIGN PATENT DOCUMENTS

| | | |
|---|---|---|
| 0797024 | 9/1997 | European Pat. Off. . |
| 2742510 | 6/1997 | France . |
| 2746159 | 9/1997 | France . |
| 3629225 | 3/1987 | Germany . |

Primary Examiner—Vinh T. Luong
Attorney, Agent, or Firm—Liniak, Berenato, Longacre & White

[57] ABSTRACT

A double flywheel, the friction members of which comprise a first ring (41) and a second ring (46) which are situated radially one outside the other, the first ring being gripped elastically in frictional contact against a friction face (40) of one of the rotating masses by a closure ring (45), a resiliently acting ring (48) being interposed between this closure ring (45) and the friction ring (46), so as to constitute two-stage friction members having a reduced number of components.

12 Claims, 18 Drawing Sheets

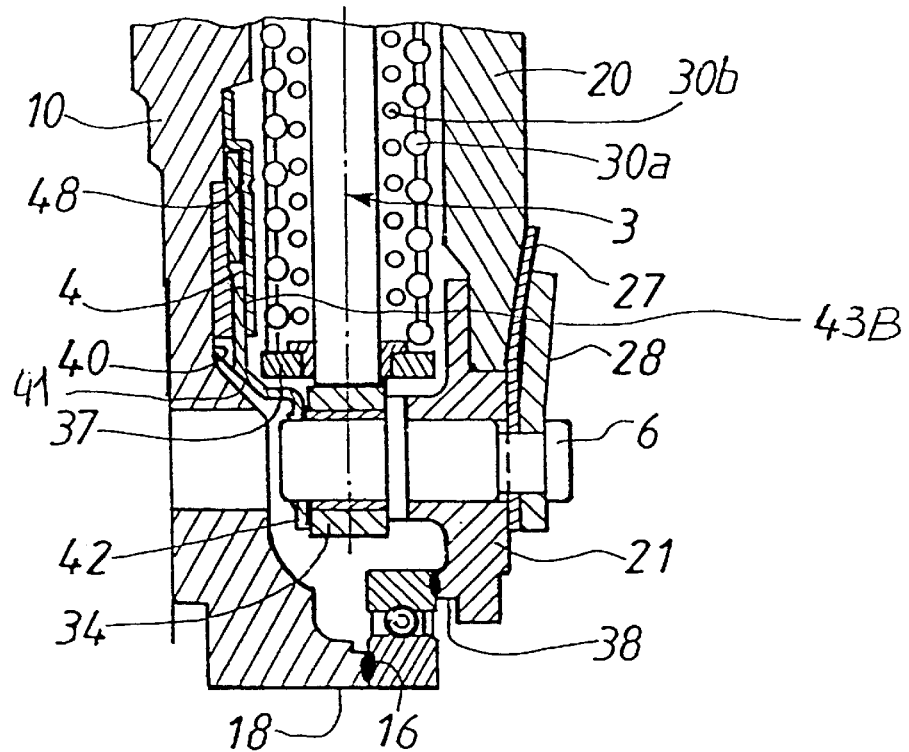
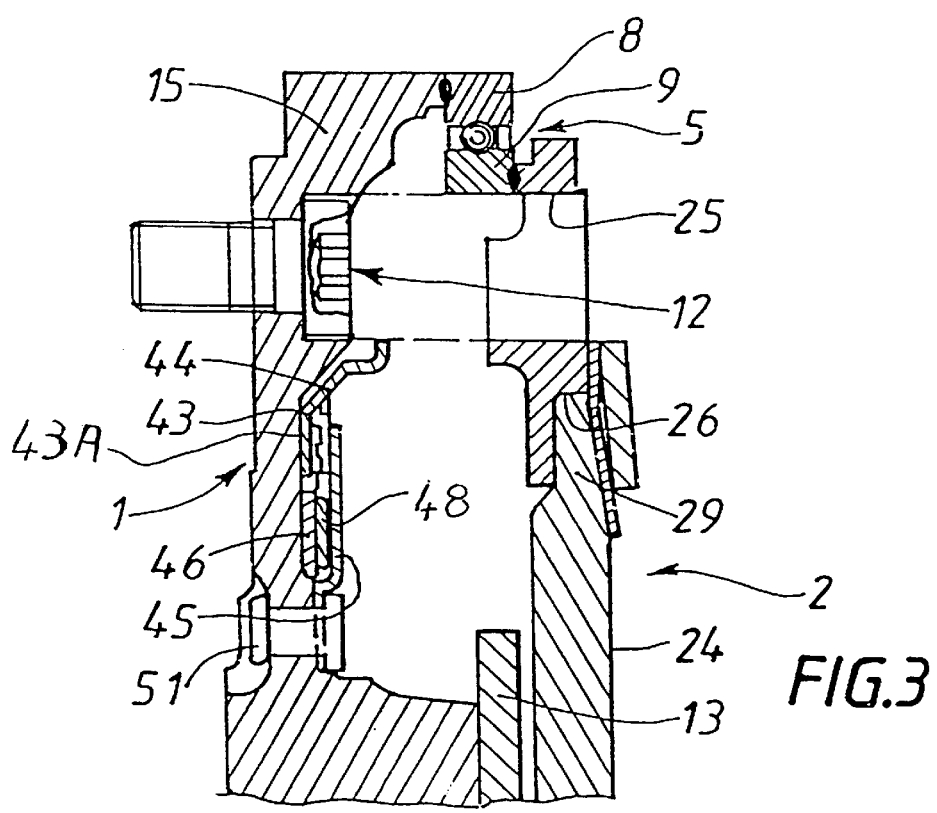
FIG.3

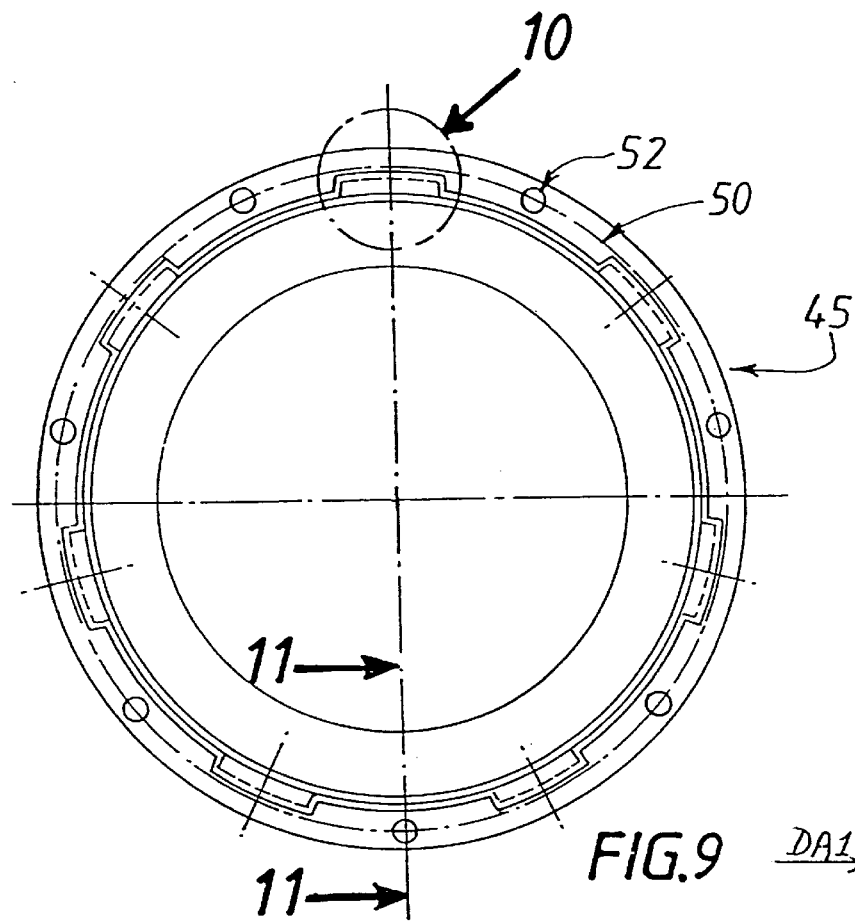
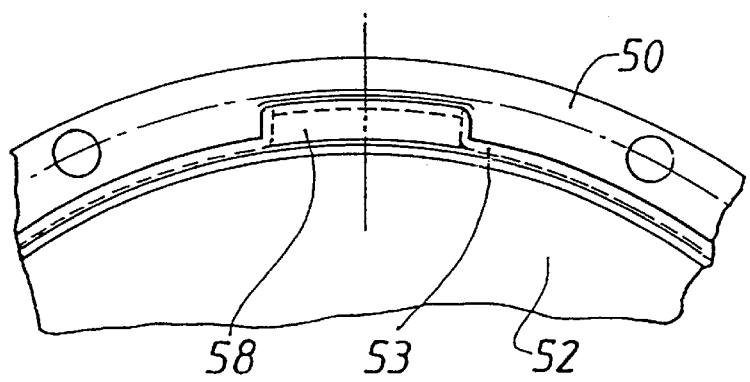
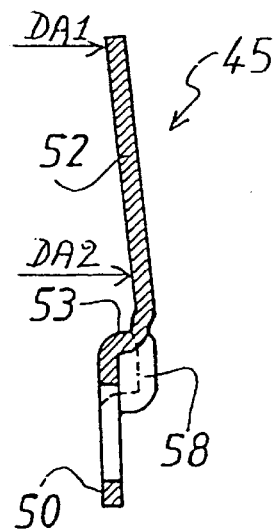
FIG.9
FIG.10
FIG.11

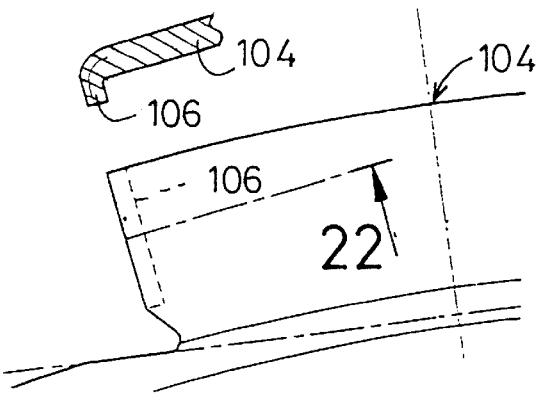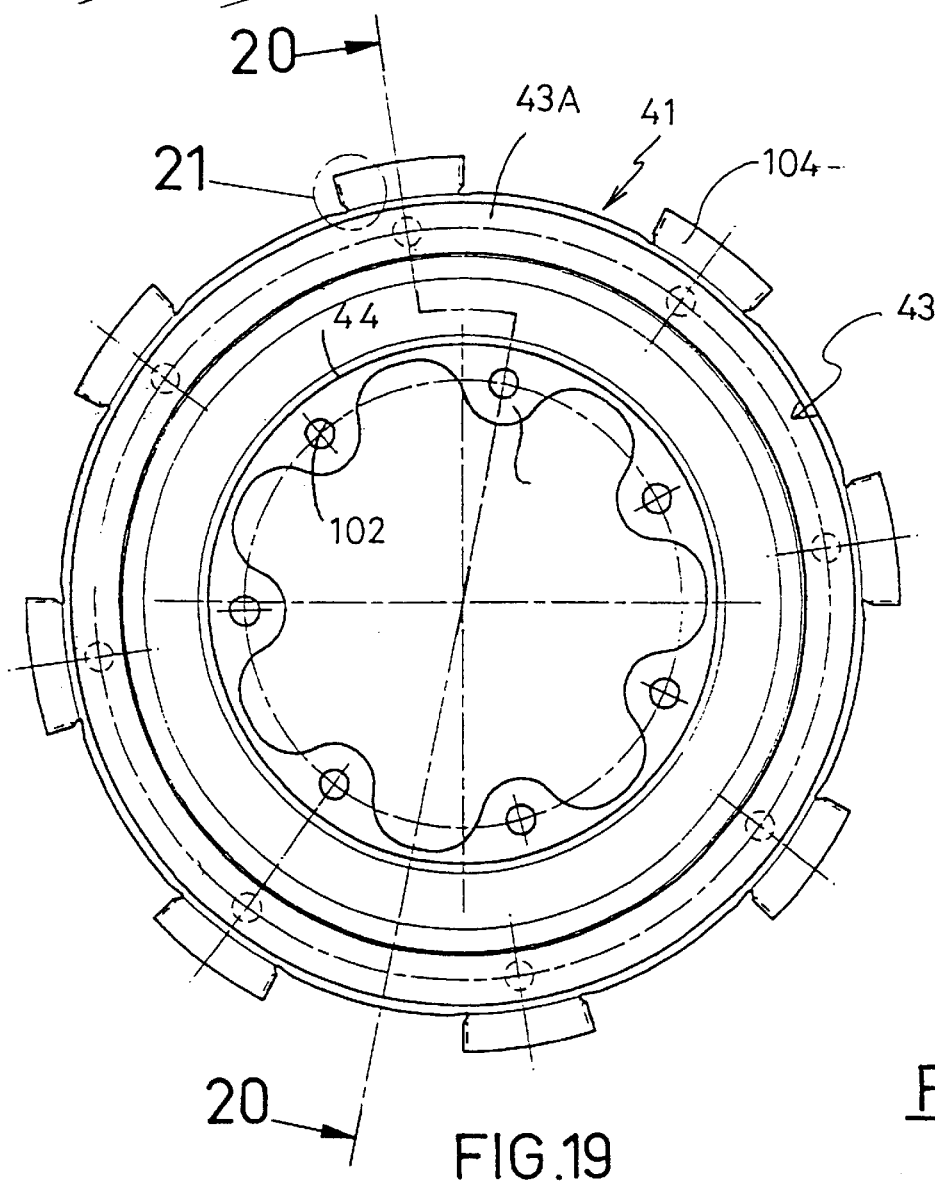

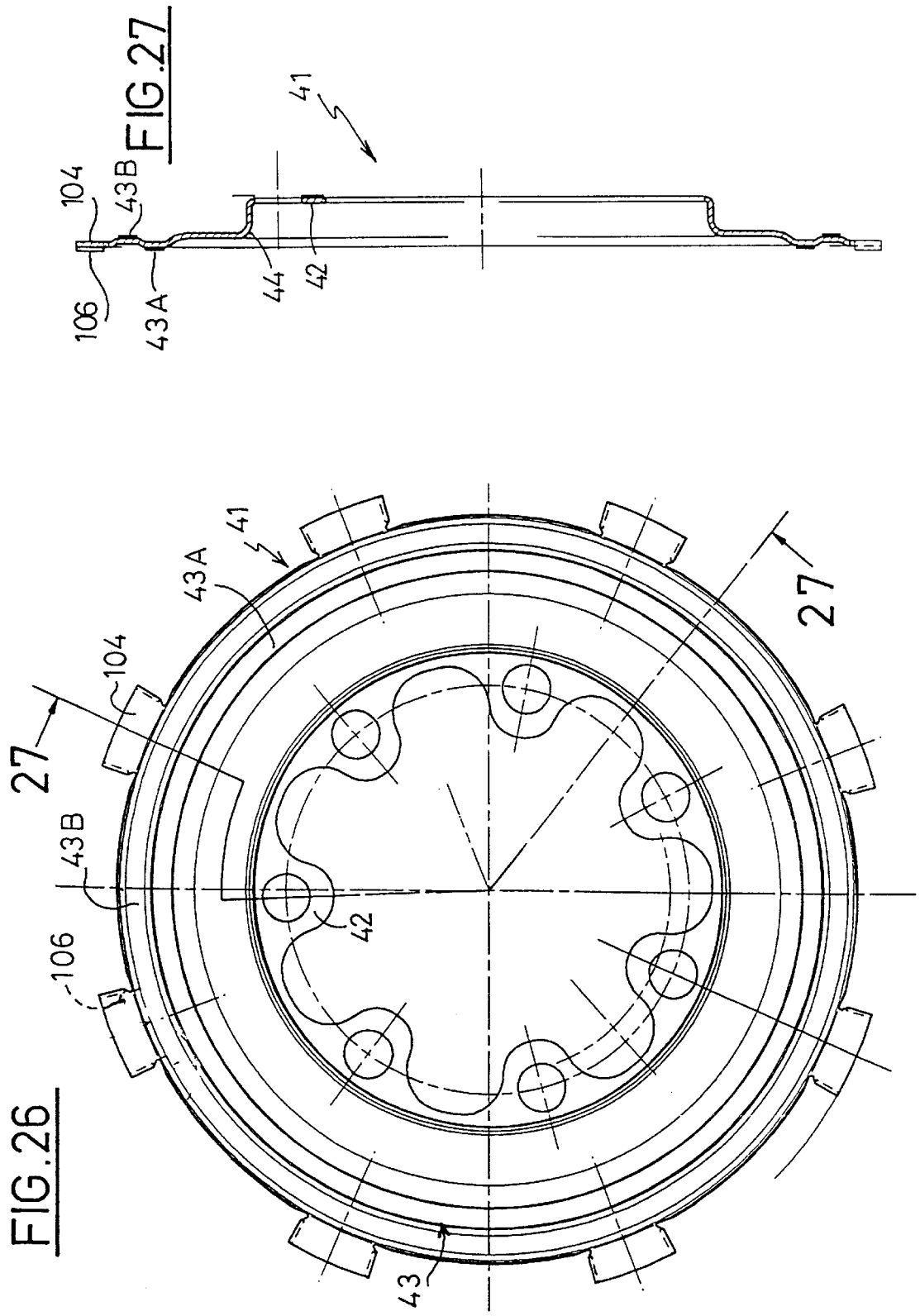

MOTOR VEHICLE DOUBLE DAMPING FLYWHEEL, COMPRISING IMPROVED MEANS FOR FRICTION DAMPING OF VIBRATIONS

BACKGROUND OF THE INVENTION

1. Field of the Invention

The present invention relates to a double flywheel, especially for a motor vehicle, comprising two coaxial rotatable masses which are mounted for rotational movement of one with respect to the other about a common axial axis of symmetry, with coupling means being interposed operatively between the two masses.

2. Description of the Related Art

It is known from French patent No. 96 03231 filed on Mar. 14, 1997 to provide a double flywheel, in particular a damped double flywheel for a motor vehicle, comprising two coaxial rotatable masses which are mounted for rotary movement of one with respect to the other about a common axial axis of symmetry, with, interposed operatively between the two masses, coupling means and axially acting friction means, which are carried mostly by one of the masses, wherein a first one of the two masses is adapted to be coupled in rotation to a driving shaft, while the second of the two masses is adapted to be coupled in rotation disconnectably to a driven shaft and includes a plate (20) constituting the reaction plate of a friction clutch, and wherein the second mass is mounted for rotation on the first mass, and of the type in which the friction means comprise:

- a control ring, referred to as the first friction ring, a portion of which is arranged to engage frictionally on a friction face of the said one of the masses, and which is coupled in rotation to the other one of the two masses;
- a friction ring, referred to as the second friction ring, situated radially outwardly of the control ring, which meshes with the control ring with a circumferential clearance, and which is biased into contact with the said friction face; and
- a closure ring fixed to the said one of the two masses, the control ring and the friction ring being placed axially between the said friction face of the closure ring.

Thanks to the friction means, the design proposed in that document enables vibrations to be damped out by creating permanent friction, generally at a low level, so as to damp out vibrations, particularly in the slow running mode of the engine, and, beyond this slow running mode, to create differentially friction of higher intensity, the damped flywheel remaining very simple and having a reduced number of components.

In general terms, the permanent friction enables small oscillations to be damped out, while the differential friction enables larger oscillations to be damped out.

The design of the damping means proposed in that document does however have the disadvantage that it calls for a high number of components, which, apart from their number and their cost, greatly complicates the operation of assembling them together.

Thus, each of the first friction ring and the second friction ring is associated with an application ring and an axially acting resilient ring, these four additional components being interposed axially between the two associated friction rings and the closure ring.

An object of the present invention is to overcome these disadvantages and to respond to these requirements in a simple and inexpensive way.

It is therefore an object of the invention to reduce the number of components in the friction means.

According to the invention, a double flywheel of the type described above is characterised in that the control ring is arranged to engage frictionally, firstly on the said friction face, and secondly on the closure ring, and in that the control ring is gripped elastically between the said friction face and the closure ring.

According to further features of the invention:

- the outer peripheral portion of the control ring is arranged to engage frictionally, firstly on the said friction face and secondly on the closure ring, which biases the control ring through its outer periphery, the control ring being gripped elastically between the said friction face and the inner periphery of the closure ring;
- the control ring has at its outer periphery two annular working friction surfaces, in particular radial or circumferential corrugations, which are offset axially and which are arranged to engage frictionally, firstly on the said friction face and secondly on the closure ring;
- the closure ring has at its outer periphery a generally transversely oriented flange, for fastening the friction ring to the said one of the two masses, and which is joined, in particular by an axially oriented zone, to a generally radially oriented base, which is centrally perforated and which is inclined towards the said one of the two masses in such a way that there exists, between the outer periphery of the base and the said friction face, an axial distance which is greater than the axial distance between the inner periphery of the base and the said friction face;
- the axial distance between the two working friction surfaces, in particular between two opposed top surfaces of the corrugations, of the control ring is greater than the axial distance between the inner periphery of the base and the said friction face;
- the friction ring is subjected to the action of an axially acting resilient ring which bears directly on the closure ring so as to bias the friction ring into contact with the said friction face;
- the resilient ring is fixed to the closure ring for rotation therewith;
- the resilient ring includes at its outer periphery inclined radial lugs which engage within press-formed projecting elements of the control ring;
- the friction ring has at its inner periphery lugs by means of which it meshes with complementary portions of the control ring;
- the working friction surfaces of the control ring are corrugations, the top surfaces of which constitute the working friction surfaces of the control ring, which are in permanent frictional contact against the said friction face and against the closure ring, and the lugs of the friction ring mesh with the corrugations;
- the working friction zones of the control ring are two radially offset annular zones, and the control ring includes, radially outwardly and beyond its outer periphery, lugs which mesh with the lugs of the friction ring;
- the said one of the two masses is the said first mass.

The following description illustrates the invention with reference to the attached drawings, in which:

BRIEF DESCRIPTION OF THE DRAWINGS

FIG. 3 is a view on a larger scale of the central part of FIG. 1;

FIG. 9 is a front view of the closure ring of the device;

FIG. 10 is a view of the portion of FIG. 9 indicated at 10;

FIG. 11 is a view in cross section taken on the line 11—11 in FIG. 9;

FIG. 19 is a view in the direction of the arrow 19 in FIG. 15, showing the control ring in the second embodiment of the friction means;

FIG. 20 is a view in cross section taken on the line 20—20 in FIG. 19;

FIG. 21 is a view on a larger scale of the detail 21 in FIG. 19;

FIG. 22 is a detail view in cross section taken on the line 22—22 in FIG. 21;

FIGS. 26 and 27 are views similar to those in FIGS. 19 and 20, but show the modified version of the second embodiment of the control ring of the friction means.

DETAILED DESCRIPTION OF THE PREFERRED EMBODIMENT

Figure 1:
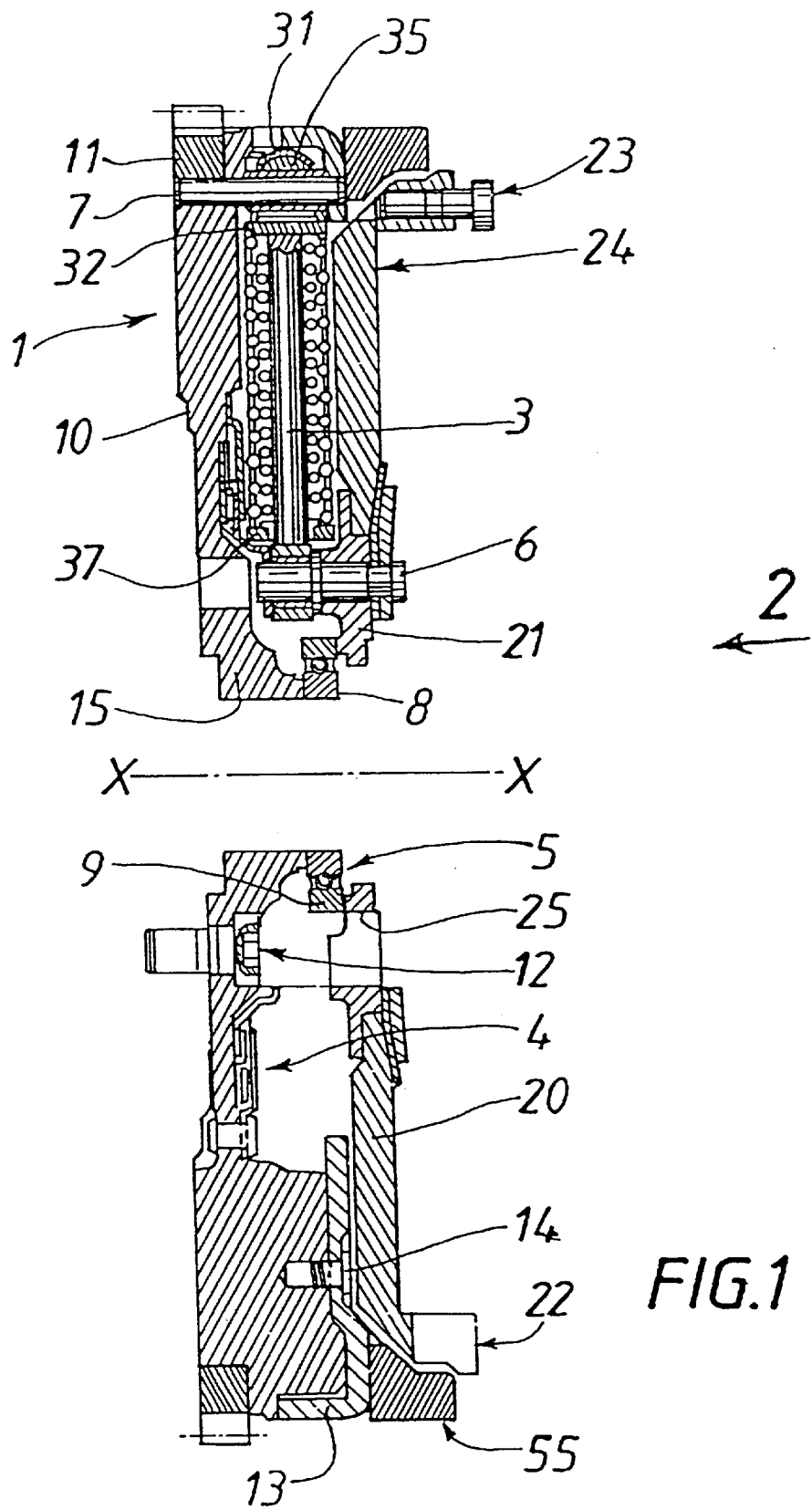
FIG. 1 is a view of a first embodiment of the invention in axial cross section taken on the line 1—1 in FIG. 2.
Figure 12:
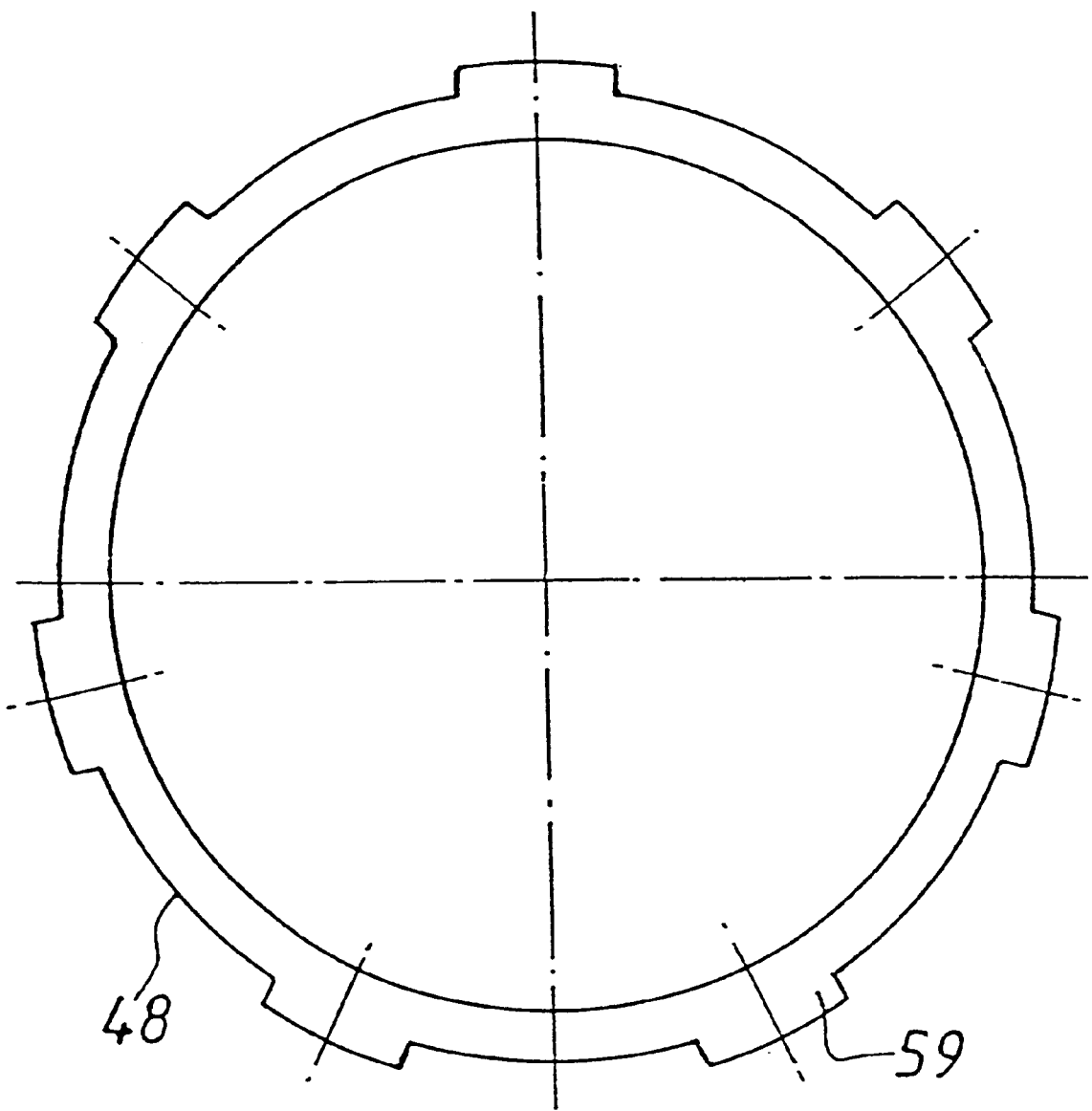
FIG. 12 is a front view of the Belleville ring of the friction device.
Figure 13:
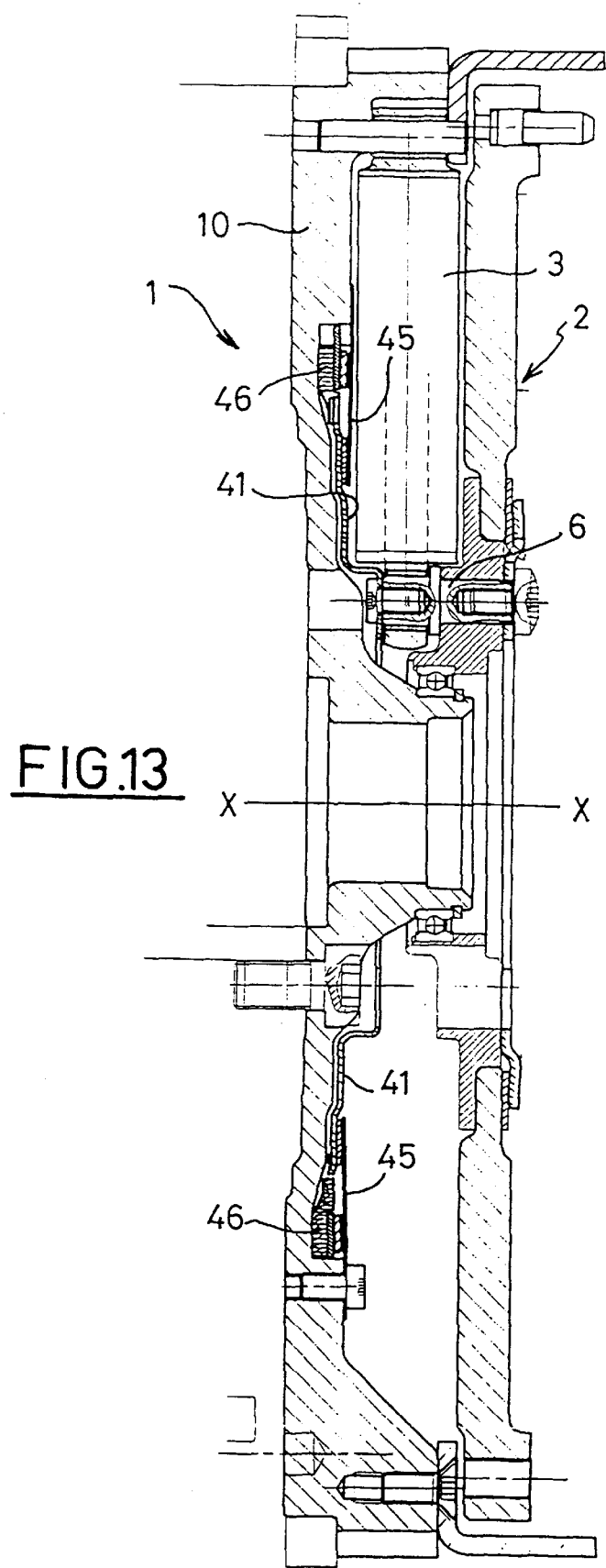
FIGS. 13 and 14 are views similar to those in FIGS. 1 and 2, but showing a second embodiment of the friction means in accordance with the features of the invention.

FIGS. 1 and 12 show a first embodiment of a double flywheel with a torsion damper for a motor vehicle.

In the known way, in a motor vehicle a friction clutch is mounted in the kinematic drive train going from the crankshaft of the engine to the input shaft of the transmission.

The clutch is a device for stopping and starting. It typically comprises an assembly of annular components, namely a cover plate, a diaphragm bearing on the cover plate, a pressure plate subjected to the action of the diaphragm and coupled in rotation (with axial mobility) to the cover plate, most often through resilient tongues, a friction disc having friction liners at its outer periphery, and a reaction plate.

The clutch is normally engaged because the diaphragm biases the pressure plate towards the reaction plate so as to clamp the friction liners of the friction disc between the said pressure and reaction plates.

Thus the torque is transmitted from the driving shaft (the crankshaft of the engine) to the driven shaft (the input shaft of the transmission) because the friction disc has a hub which is mounted in rotation, through splines, on the input shaft of the transmission, which is most often a gearbox.

In order to disengage the clutch, action is exerted with the aid of a clutch release bearing on the inner ends of the fingers of the diaphragm—by pushing or pulling according to the type of clutch—so as to overcome the force exerted by the diaphragm on the pressure plate.

Thus, in a friction clutch, the reaction plate is coupled disengageably to a driven shaft, and to this end it offers a friction surface to the appropriate friction liner of the friction disc.

In a conventional clutch, the reaction plate constitutes a flywheel which is secured by means of fastening screws to the crankshaft of the engine.

In order to damp out vibrations, it has been proposed to divide the flywheel into two parts, one of which comprises the reaction plate, the other one comprising a primary mass which is arranged to be secured on a driving shaft, namely the crankshaft of the engine in the case of application to a motor vehicle.

The reaction plate is part of a second mass which is rotatably mounted on the first mass through interposed bearing means, most often in the form of a ball bearing.

Vibration damping is obtained with the aid of resilient damping means and friction means which act between the two masses. The said resilient means constitute coupling means which act between the two masses.

The resilient damping means may be fitted so as to act circumferentially between the two masses.

In that case, for example, the first mass has abutments, in facing relationship with each other, for the circumferential ends of the resilient damping means, which are conventionally in the form of coil springs. These abutments are carried respectively by a plate of the first mass and a disc which is fixed to the said plate.

A secondary disc, fixed to the second mass, penetrates between the plate and disc of the first mass, so as to act also, by means of arms, on the circumferential ends of the coil springs.

In another version, the resilient damping means may be fitted so as to act generally radially between the two masses.

The friction means are typically axially acting, and include at least one friction ring which is subjected to the action of axially acting resilient means.

Such a device is called a torsion damped double flywheel. In another version, the friction means may be radially acting where the coupling means are of the centrifugal type.

In the drawings, the double flywheel comprises two coaxial rotatable masses 1, 2 which are mounted for rotation of one with respect to the other about a common axial axis of symmetry X—X, against the action of resilient damping means 3 and axially acting friction means 4.

The second mass 2 is mounted rotatably on the first mass 1 with the aid of bearing means 5, which in this example consist of a ball bearing 5 and which are interposed centrally between the two masses 1, 2, that is to say at the level of the inner periphery of each mass.

The ball bearing 5 in this example is of a standard type, and comprises balls which are mounted radially between an inner ring 8 and an outer ring 9, these rings being solid and concentric.

The second mass 2 in this example consists of two concentric parts 20, 21.

One of the parts, namely the radially outermost part 20, constitutes the above mentioned reaction plate of the friction clutch, while the other part 21 constitutes a central hub for the first part, which is mounted for rotation on the said hub 21 in a manner to be described below.

The rolling bearing 5 is interposed operatively between the inner periphery of the hub 21 of the second mass 2 and the central part (the inner periphery) of the first mass 1.

The first mass 1 also includes a plate 10. The plates 10, 20 are made of mouldable material, in this example as castings for increasing inertia. The plates 10, 20 are parallel to each other and offset axially with respect to each other.

In another version the plate 10 may be based on aluminium.

The plate 10 carries at its outer periphery a starter crown 11 which is arranged to be driven by the starter of the vehicle.

The plate 20 has at its outer periphery an annular flange 22 for fastening the cover plate (not shown) of the clutch.

In this example there are shown one of the fastening screws for the cover plate at 23, and, at 24, the friction face offered by the reaction plate 20 to the appropriate friction liner of the friction disc.

The hub 21 has, radially outwardly of the ball bearing 5, passages 25 permitting access to the heads of the screws 12 that fasten the first mass 1 to the crankshaft of the engine. The threads of the screws 12 extend through holes (not given a reference numeral) which are formed in the vicinity of the central part of the plate 10, in axial coincidence with the passages 25. The heads of the screws 12 bear on the plate 10, and each of them has a socket for an appropriate tool which is passed through a passage 25 of the second mass 2, for enabling the screws 12 to be tightened.

The hub 21 has at its outer periphery a groove 26 which is open outwardly in a direction away from the mass 1. The hub 21 therefore includes at its outer periphery, firstly a collar which projects radially and which constitutes the flank of the groove 26, and secondly, a base portion constituting an axially oriented cylindrical centring surface. The groove 26 is closed on the outside by a metal application ring 27 which constitutes the other flank of the groove 26. This application ring 27 is subjected to the action of an axially acting resilient ring 28. The reaction plate 20 has a reduced thickness at its inner periphery, so that it has an annular element 29 engaged in the groove 26, which is closed by the ring 27.

The internal bore of the annular element 29 is centred by the base of the groove 26, while the inner face of the annular element 29 is in contact with the collar portion of the hub 21, and the outer face of the annular element 29 is in contact with the application ring 27. This outer face, which faces away from the plate 10, is inclined, as is the outer periphery of the ring 27 which is in contact with the said outer face under the action of the resilient ring 28, which is also inclined at its outer periphery.

The said ring 28 is of the Belleville type.

Figure 2:
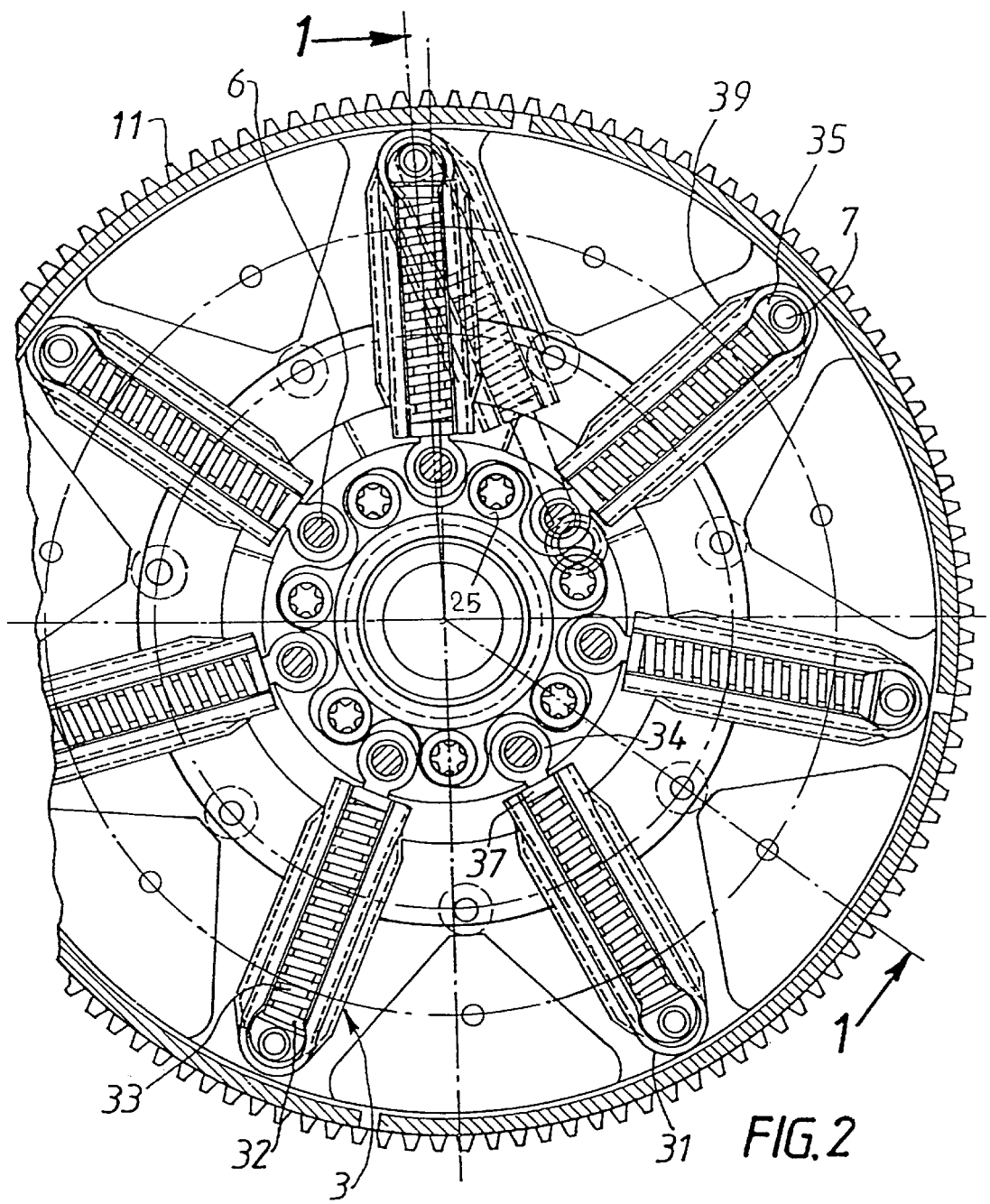
FIG. 2 is a view in the direction of the arrow 2 in FIG. 1 without the second mass and the cup member with its supplementary member.

The rings 27, 28 have a transverse portion at their inner periphery by means of which they are fixed to the hub 21 with the aid of fastening members 6 which extend through the said rings. These members 6 are located on a pitch circle the diameter of which is close to, and in this example slightly greater than, that of the passages 25, as can be seen in FIG. 2.

The members 6 are arranged in circumferential alternation with the circular passages 25, which in this example have a diameter greater than that of the heads of the screws 12.

There is thus formed a torque limiter which, in the case of an over-torque, and in a known way, permits relative rotation between the plate 20 and the hub 21, in particular in order to protect the resilient damping means 3.

The annular element 29 is of course treated so as to give it the necessary hardness, as are the centring base, the collar portion of the hub 21 and the ring 27.

In this example the resilient means 3 comprise a plurality of elastic cassettes 3, which are spaced apart circumferentially at regular intervals (FIG. 2) and which are fitted generally radially between the two masses 1, 2. The cassettes 3 are disposed axially between the plate 10 and the second mass.

Each cassette 3 encloses at least one helical spring 30a within a housing 31. A piston 32, with a rod 33, moves within the housing 31. The rod 33 has, at its free end (on the outside of the housing 31), an articulating element 34 referred to as the second articulating element.

The housing 31 carries at its outer periphery an articulating element 35, referred to as a first articulating element, which is interposed in the form of a ring between the outer end of the housing 31 and the piston 32. In this example, two concentric coil springs 30a, 30b are provided for each cassette 3.

The first articulating element 35 constitutes a knuckle portion which is immobilised by the profile of the housing 31, which in this example is made from a flat piece of metal bent into the shape of a hairpin around the knuckle portion 35, with longitudinal ribs 39 being formed. The springs 30a, 30b bear on the piston 32, which is secured on the end of the rod 33 by a rolling operation, and on an abutment 37 through which the rod passes and which is fixed to the free end of the housing 31, in this example by welding.

Thus, after the rod 33 has been passed through the abutment 37, and the springs 30a, 30b have been fitted, the rod 33 is welded to the piston 32, and finally the abutment 37 is welded to the housing 31.

Each of the articulating elements 34, 35 is provided with a cylindrical bore which constitutes a rotary bearing. A round pin 6, riveted to the second mass, is engaged in the internal bore of the second articulating element 34.

Similarly, a round pin 7, fixed to the first mass 1, is engaged in the internal bore of the first articulating element 35.

In this example, smooth anti-friction bearings (not given a reference numeral) are interposed between the round pins 6, 7 and the internal bores of the second articulating element 34 and first articulating element 35.

In another version, the said bearings may be replaced by needle bearings.

In this example, each of the round pins 7 is force-fitted at one of its axial ends in a hole, not given a reference numeral, which is formed in the outer periphery of the plate 10, and is force-fitted at its other end in a hole of a closure piece 13, which is made from metal plate in the form of a cup member open in the centre.

Thus, the plate 10 and the closure piece 13 together define a U-shaped bracket element for mounting the round pins 7.

This bracket element also enables the housings 31 to be positioned axially.

The piece 13 is fixed by means of screws 14 to the plate 10 in thick zones outside the cassettes 3. In another version, the piece 13 is secured to the plate 10 by riveting or welding.

The plate 10 thus has triangular recesses for the cassettes 3 (FIG. 2).

It will be appreciated that the closure piece 13 stiffens the plate 10, and that it carries, fixed to it, by welding in this example, a supplementary member 55 which extends radially outwardly from the flange 22 in order to increase the inertia of the first mass.

In this example the round pins 6 constitute the above mentioned members for fastening to the hub 21 the rings 27, 28 of the torque limiter.

Thus the cassettes 3 are articulated on the pins 7 at the outer periphery of the first mass 1, and articulated to the inner periphery of the second mass 2, in this case on the hub 21, by means of the pins 6.

The rod 33 extends through the abutment 37, which is in the form of a ring, with an anti-friction bearing, not given a reference, being interposed.

The springs 30a, 30b bear on the piston 32 and the abutment 37 fixed to the housing 31, so that they work in compression.

In the rest condition, the pins 6, 7 are aligned radially.

In a further version, the pins 6, 7 may of course be slightly offset circumferentially when the two masses 1, 2 are at rest.

The springs 30a, 30b then work generally radially in compression.

During a relative movement between the two masses, the cassettes 3 become inclined, as can be seen for one of them in phantom lines in FIG. 2.

This results in displacement of the piston 32 in the housing 31, and compression of the springs 30a, 30b.

It will be noted that the pins 6 have a collar portion in contact with the inner face of the hub 21 that faces towards the plate 10. Each pin 6 is defined by the said collar portion extended by the cylindrical portion of smaller diameter that passes through the hub 21 and is terminated by a tail portion of reduced diameter extending through the rings 27, 28.

This tail portion is subsequently upset so that the rings 27, 28 are trapped between the outer face of the hub 21 and the upset part of the tail portion of the pin 6.

The length of the cassettes 3 is accordingly large.

With a view, especially, to lengthening even more the distance between the pins 6, 7, and to simplifying at least one of the masses 1, 2, it is proposed to secure at least one of the rings of the rolling bearing 5 to the corresponding mass 1, 2 by direct welding.

This welding is carried out between one of the transverse faces of the relevant ring of the rolling bearing 5 and a transverse shoulder, in facing relationship with it, of the corresponding mass 1, 2.

In FIG. 1, the plate 10 of the mass 1 has, radially inwardly of the screws 12, a thickened portion 15 which constitutes the central part (i.e. the inner periphery) of the plate 10.

This thickened portion 15, which projects axially over a short length, has a transverse end face 16. It is this transverse face 16 that is fixed to the facing transverse face of the inner ring 8 of the rolling bearing 5.

The inner ring 8, which is solid in this example, or the transverse face 16 has a local axial projection, for example a point, for local contact with the other transverse face before the welding operation. This projection reduces the zone of contact between the two faces, which assists the upsetting of the material.

In this example, the outer ring 9 of the bearing 5 is also welded to the second mass. The bearing 5 thus constitutes an axial spacer between the two masses.

More precisely, the ring 9 is welded to the hub 21 of the torque limiter, which in this example is treated so as to have the desired hardness.

The hub 21 has an axially oriented collar portion 38, the thickness of which is less than the height of the outer ring of the rolling bearing. The collar portion 38 projects from the face of the hub 21 that extends towards the plate 10 of the first mass 1. It extends axially over a short length, and at its free end it has the transverse face which is arranged, according to the invention, to be joined by welding to the transverse face, in facing relationship with it, of the outer ring 9 of the bearing 5.

The transverse face of the collar portion 38 of the hub 21, or the transverse face, in facing relationship with it, of the ring 9, does of course have, prior to the welding operation, an axial projection which is designed to be crushed and heated by condenser discharge during the welding operation.

Figure 4:
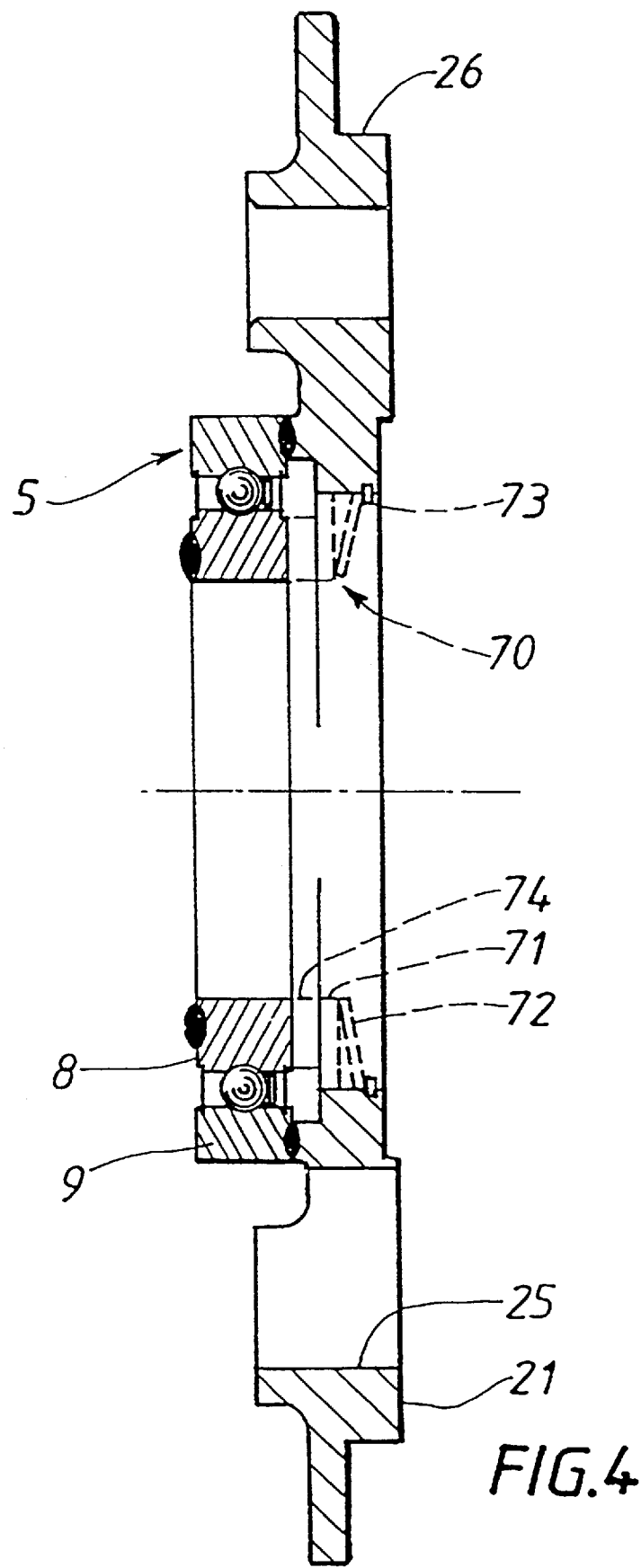
FIG. 4 is a view showing the welding of the outer ring of the rolling bearing centrally to a hub of the second mass constituting the inner part of the latter, with an optional friction device shown in broken lines.
Figure 5:
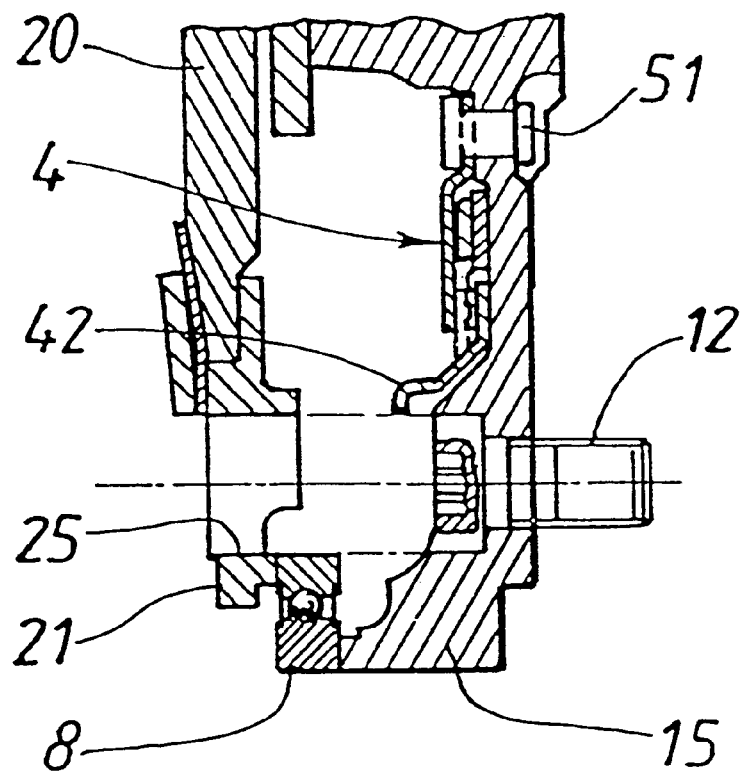
FIG. 5 is a view showing the final welding of the inner ring of the rolling bearing to a central thickened portion of the first mass.
Figure 6:
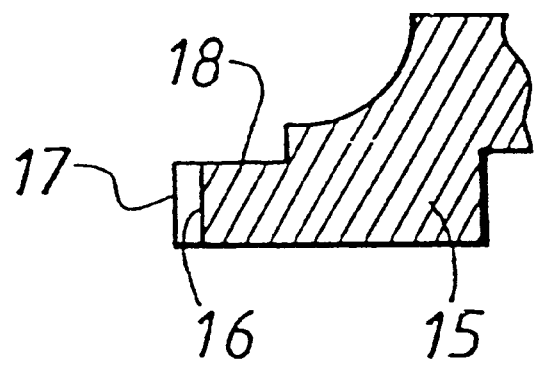
FIG. 6 is a partial view of the thickened portion of the first mass, showing the projecting element of the latter.

In another version, advantage may if necessary be taken of this to fit a friction device 70 (see FIG. 4 in broken lines) between the other transverse face of the welded ring and the other mass.

For example, a friction device may be interposed between the projecting element 15 and the transverse face of the outer ring 9.

This friction device is preferably interposed between the hub 21 and the thickened inner ring 8.

The hub 21 has, for example at its inner periphery, at least one axial projection in the form of a rib, which is not given a reference numeral.

The friction device comprises an application ring 71 which includes at its outer periphery a notch, the form of which is complementary with the rib of the hub, for coupling the application ring in rotation—with axial mobility—to the hub 21.

Preferably, at least two projecting elements, spaced apart by 90°, and two complementary notches, are provided, and the structures can be reversed, with the hub having the notches for example.

The application ring 71 is subjected to the action of an axially acting resilient ring 72 that bears on an abutment 73 which is axially fixed to the hub 21, for example a resilient annular ring or circlip engaged in a groove in the hub.

A friction ring 74 is then interposed axially between the application ring and the inner ring 8. This friction ring is for example adhesively bonded or riveted on the application ring. The resilient ring 72 biases the application ring towards the ring 8, so as to grip the friction ring 74 between the application ring 71 and the transverse face of the inner ring 8.

It will be appreciated that the thickened portion 15 is relatively massive, so that the first mass is robust in the centre.

For a given overall axial dimension at the centre of the double flywheel, it is possible to reduce the overall radial dimension at the centre, while increasing the thickness of the massive inner ring 8 of the ball bearing 5 of the standard type, in order to increase the robustness of the bearing 5 and to constitute a friction face for the above mentioned friction device 70.

In this example, the friction means 4 are fitted so as to be mostly outside the pins 6 radially. These means are fitted in the vicinity of the plate 10, which in this example offers a friction face 40 for the said means 4, which are thus spaced away from the reaction plate 10 and are therefore protected.

In accordance with the invention, the means 4 include a control ring 41 which is coupled in rotation to the pin 6.

The ring 41 has at its inner periphery a flange portion with transversely oriented radial lugs 42 formed with holes, and, at its outer periphery, corrugations 43.

The lugs 42 are arranged in circumferential alternation with the screws 12, so that the ring 41, in the region of the screws 12, is located radially outside the screws 12 and has apertures for the latter.

An inclined portion 44 joins the peripheral portions 43, 42 together.

The pins 6 extend through the holes in the lugs 42, so that the ring 41 is coupled in rotation to the pins 6 while being movable axially.

The inclined portion 44 enables the desired axial offset to be created between the peripheral portions 42, 43, and enables any interference with the screws 12 to be avoided.

The peripheral portion 43 is a corrugated portion, the alternate top surfaces 43A and 43B of which are situated on a common diameter.

The peripheral portion 43 is enabled by its corrugations 43A, 43B to rub frictionally, firstly on the face 40 of the plate 10 that faces towards the cassettes 3 and the reaction plate 20, and secondly, on a hollow member in the form of a cover plate, which is referred to as the closure ring 45. The face 40 may have a special coating, or may be part of a ring fixed to the plate 10.

Radially outwards from the control ring 41, a friction ring 46, having lugs 47 at its thickened inner periphery, is mounted concentrically.

The ring 46 which surrounds the ring 41 is preferably of a synthetic material, and is subjected to the action of an axially acting resilient ring 48 which in this example is a Belleville ring, and which bears on the closure ring so as to bias the friction ring 46 into contact with the face 40 of the plate 10.

The Belleville ring 48 is fixed to the closure ring 45 for rotation with it, the latter having at its outer periphery a generally transversely oriented flange 50 which is directed radially outwards. This flange 50 has from place to place holes, not given a reference numeral, for fastening of the ring 45 to the plate 10 with the aid of rivets 51.

The radial flange 50 is joined to the base 52 through an axially oriented annular zone 53. The base 52, which has central holes, is inclined towards the plate 10. There is therefore an axial distance DA1, between the outer periphery 45 of the base 52 and the face 40 of the plate 10, which is greater than the axial distance DA2 between the inner periphery of the base 52 and the said face 40.

The base 52 thus constitutes an axially acting Belleville ring.

The axial distance between two opposed top surfaces of the corrugations 43A, 43B of the control ring 40, which is of metal in this case, is greater than the axial distance between the inner periphery of the base 52 and the face 40.

The closure ring 45 thus biases the control ring 41 elastically into contact through its outer periphery 43, 43A,
with the face 40 of the plate. The ring 41 is therefore gripped elastically between the face 40 and the inner periphery of the closure ring 45.

The axially acting resilient means in this example lie radially outwardly of the heads of the screws 12, being carried mostly by the first mass 1.

It will be noted that the inclined portion 44 is joined to an axially oriented portion (not given a reference numeral) of the ring 41, at the inner periphery of the latter.

The friction means 4 are compact in the axial direction, and comprise a reduced number of components, due in particular to the fact that the control ring 41, through its outer periphery 43 having the circumferential corrugations 43A, 43B, makes alternate contact with the face 40 and the ring 45.

The closure ring 45 also enables a component to be omitted, because it is deformed by the control ring 41 and exerts elastic gripping action on the latter.

Thus the presence of one resilient ring is eliminated.

The said closure ring 45 has local press-formed projections. These projections 58 are formed locally in the flange 50, the zone 53 and the outer periphery of the base 52.

The press-formed projections 58 are arranged in circumferential alternation with the through holes for the rivets 51 by which the ring 45 is fastened to the plate 10.

The Belleville ring 48 includes at its outer periphery inclined radial lugs 59, which enter into the hollows of the projections 58. The ring 48 is thus coupled in rotation to the closure ring, in this example without any circumferential clearance, and bears directly on the friction ring 46, thus also constituting an application ring, which leads to a reduction in the number of components.

The said friction ring 46 meshes, through its internal lugs 47, with the corrugations 43A, 43B of the outer portion 43 of the ring 41. To this end, each lug 47 is received between two top surfaces 43A, and lies facing a top surface 43B.

This is easily achieved because of the corrugations.

Thus, the corrugations naturally constitute means for driving the ring 46, surrounding the control ring 41 with its associated ring 48. The top surfaces of the corrugations constitute active friction surfaces.

Figure 7:
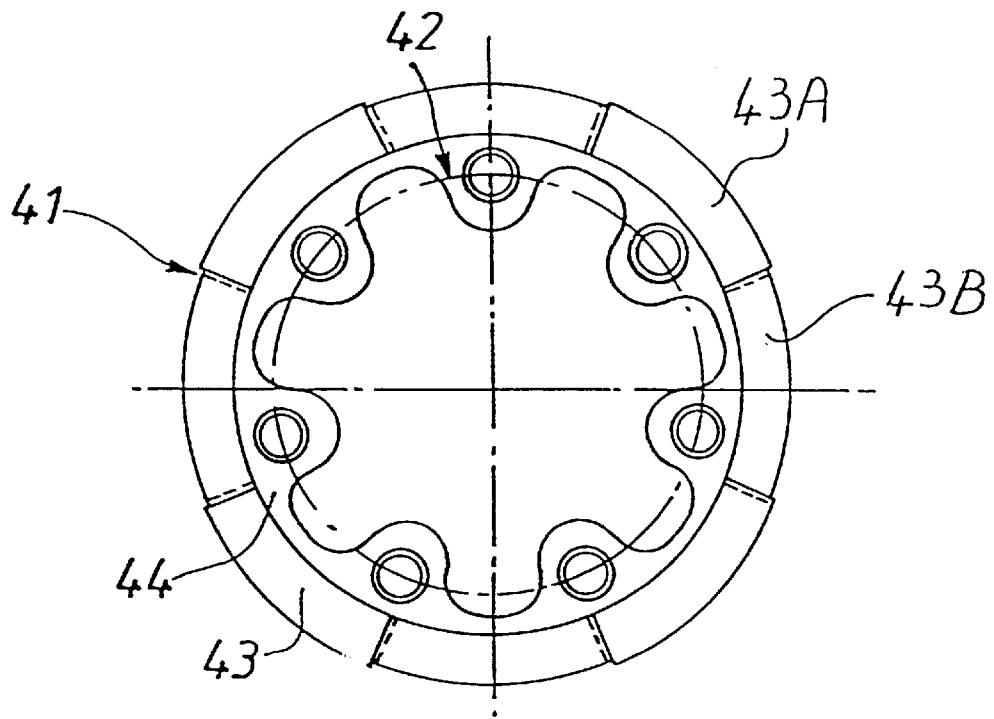
FIG. 7 a front view of the control ring of the friction device adjacent to the first mass.
Figure 8:
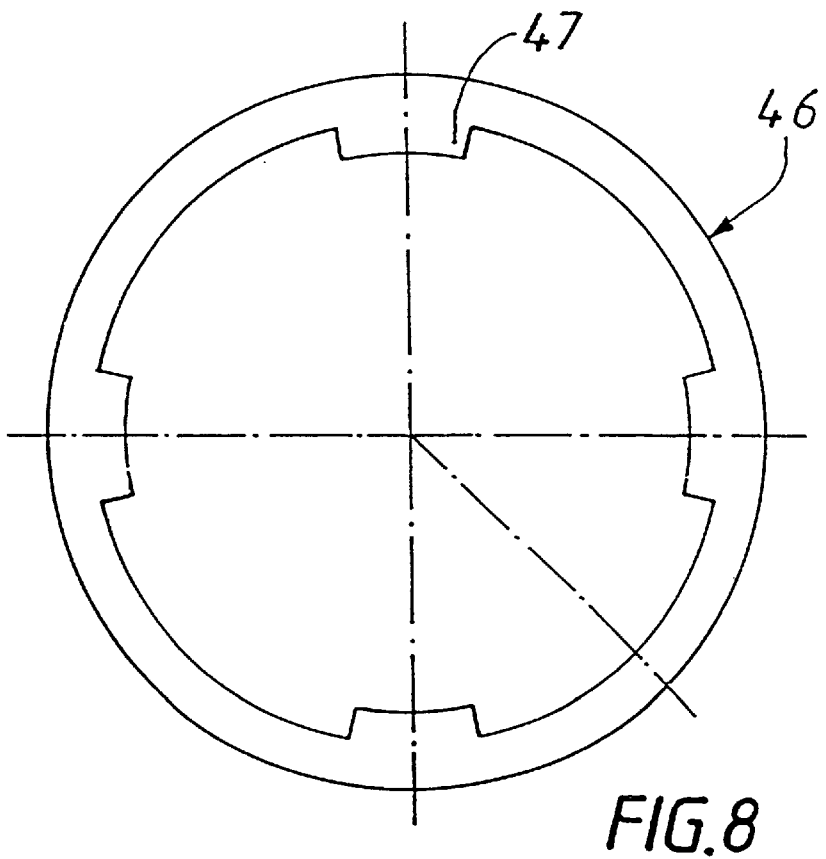
FIG. 8 is a front view of the friction ring of the friction device.

The lugs 47 in this example penetrate, with a circumferential clearance (99, as shown in FIG. 7), into the hollows 43B defined by the corrugations 43A.

After the clearance has been taken up, the ring 46 is driven in rotation by the ring 41, and engages frictionally against the face 40 and the ring 48. In this example the ring 41 is in permanent frictional engagement against the face 40 and the ring 45. In this way vibrations are well damped.

In that connection, the ring 41 is enabled, by cooperation with the face 40 and the ring 45, to damp out vibrations in the slow running mode of the engine.

The friction ring 46, by cooperation with the face 40 and the ring 48, is caused to act in a staged or differential way to damp out vibrations in the normal running mode of the vehicle.

The friction means 4, with two concentric friction rings 41, 46, are inexpensive and simple, and lead to a reduced number of components.

The present invention is of course not limited to the embodiments described.

For example, the cassettes 3 may be replaced by springs, including at each of their ends a loop for mounting on the round pins. In that case, the radial springs work in tension.

The resilient means 3, for damping (and also for coupling) may be of a circumferentially acting kind as described above.

In another version, they may be fitted at the outer periphery of the double flywheel, for example in the manner described in the document FR-A-2 662 760.

The coupling means may be of the centrifugal type, as described in the document FR-A-2 044 978.

It will be noted that the construction of the second mass 2 in two parts 20, 21 enables the outer bearing ring to be easily welded.

The presence of the torque limiter is of course not obligatory, the second mass being able to be made integral, for example as a casting.

The first mass may be of steel.

The second embodiment of the friction means shown in FIGS. 13 to 22 will now be described, and a modified version shown in FIGS. 23 to 27, in which those elements which are identical, similar or analogous to those described above are designated by the same reference signs.

In the second embodiment, and as can be seen in particular in FIGS. 15 to 18, the design of the closure ring 45 is simplified, and it is in the form of a thin hoop, the outer periphery 500 of which is fixed to the plate 10 of the first rotating mass 1 by means of screws 51, instead of by the rivets used in the first embodiment.

In order to increase the axial elasticity of the ring 45, the base 52 has a set of apertures 200 which are spaced apart circumferentially and which are in the form of rectangular windows.

As regards the control ring 41, its inner periphery 42 in this example is driven in rotation by the articulating pivots 6, or round pins 6, of the damping cassettes 3, by means of interposed screws 100 which extend through holes 102 formed in the internal radial lugs of the internal peripheral zone 42, which are arranged alternately with apertures giving access to the screws 12.

The screws 100 are screwed into the pivots or round pins 6. Similarly, screws, not given a reference numeral, are screwed into the other end of the pivot so as to retain the rings, not having a reference numeral, of the torque limiter.

As compared with the first embodiment, the inclined junction zone 44 in this example is made in the form of a bend.

The control ring 41 cooperates frictionally with the face, in facing relationship with it, of the internal radial peripheral portion of the base 52 of the control ring 45, through an annular friction pad 143A, which is a friction ring attached on the face, in facing relationship with it, of the control ring 41, which in this example is of metal.

Beyond its outer radial periphery 43, the control ring 41 includes a set of lugs 104, which are spaced apart circumferentially at regular intervals, and which extend radially outwardly, with each of them comprising two wing portions 106 which are bent back axially towards the plate 10 of the first rotating mass 1.

The lugs 104, with their wing portions 106, constitute rotary meshing means between the control ring 41 and the friction ring 46.

In this connection, each of the lugs 104 with its two wing portions 106 is received with a circumferential clearance between two consecutive internal radial lugs 47 of the ring 46.

As regards the design itself of the friction ring 46, such as that illustrated in FIGS. 13 to 16, this is made in the form of a ring moulded in a friction material.

The axially acting resilient ring 48, which is interposed between the closure ring 45 and the friction ring 46, acts on the latter through an interposed application ring 108, which has external radial lugs 110 that are received without any circumferential clearance in complementary recesses 112, which are formed in the plate 10 in a thickened portion of the latter and which are open axially towards the damping means 3.

The embodiment shown in FIGS. 23 to 27 will now be described.

In this embodiment, the control ring 41 cooperates with the friction surface 40 and with the closure ring 45 through two annular friction surfaces 243A and 243B which are offset radially with respect to each other, and each of which may be provided with an annular friction pad as shown in FIGS. 26 and 27. The ring 41 is accordingly radially corrugated.

Meshing between the control ring 41 and the friction ring 46 is obtained by the same means as those described with reference to the previous embodiment.

The axially acting resilient ring 48, interposed between the closure ring 45 and the friction ring 46, acts directly on the latter as in the case of the first embodiment, and it cooperates through its lugs 59 with corresponding press-formed projecting elements formed in the closure ring 45, here again as in the case of the first embodiment.

The pivot or round pin 6 is identical to that in FIGS. 1 and 3. The closure ring is fixed to the plate 10 by means of rivets 51 as in FIG. 1. The base 52 is identical to that in FIG. 1, and is accordingly in the form of a Belleville ring.

In all cases, the ring 46 surrounds the ring 41 and meshes with a clearance with the control ring 41, which is gripped elastically between the friction face 40 and the closure ring 41.

The control ring 41 therefore has radial corrugations (FIGS. 27) or circumferential corrugations (FIG. 7), and is subjected to the action of the axially elastic closure ring 45. The ring 45, by means of its elastic base 52, biases the control ring 41 axially towards the plate 10, with the friction means 4 being fitted axially between the cassettes 3 and the plate 10.

Figure 14:
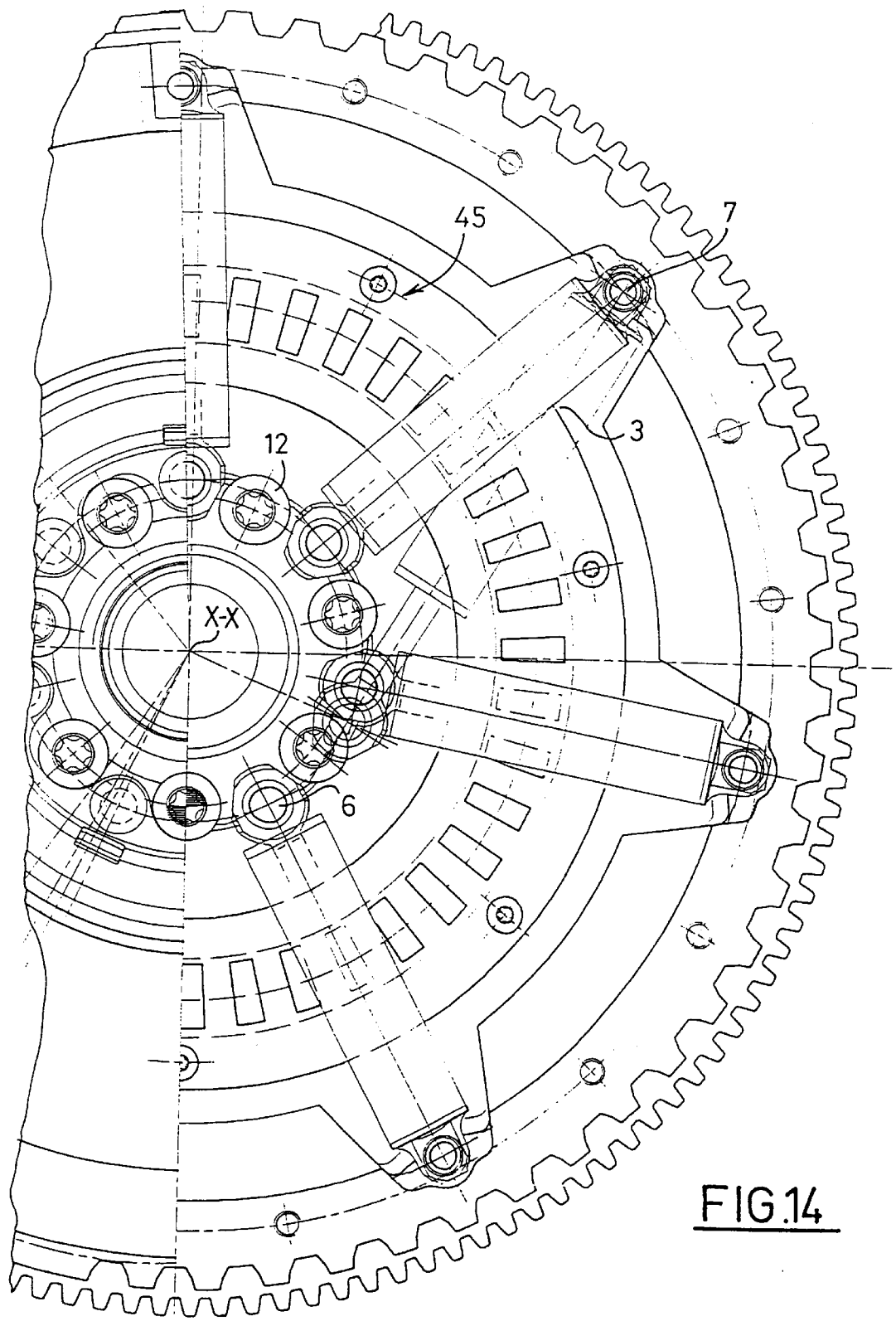
Figure 15:
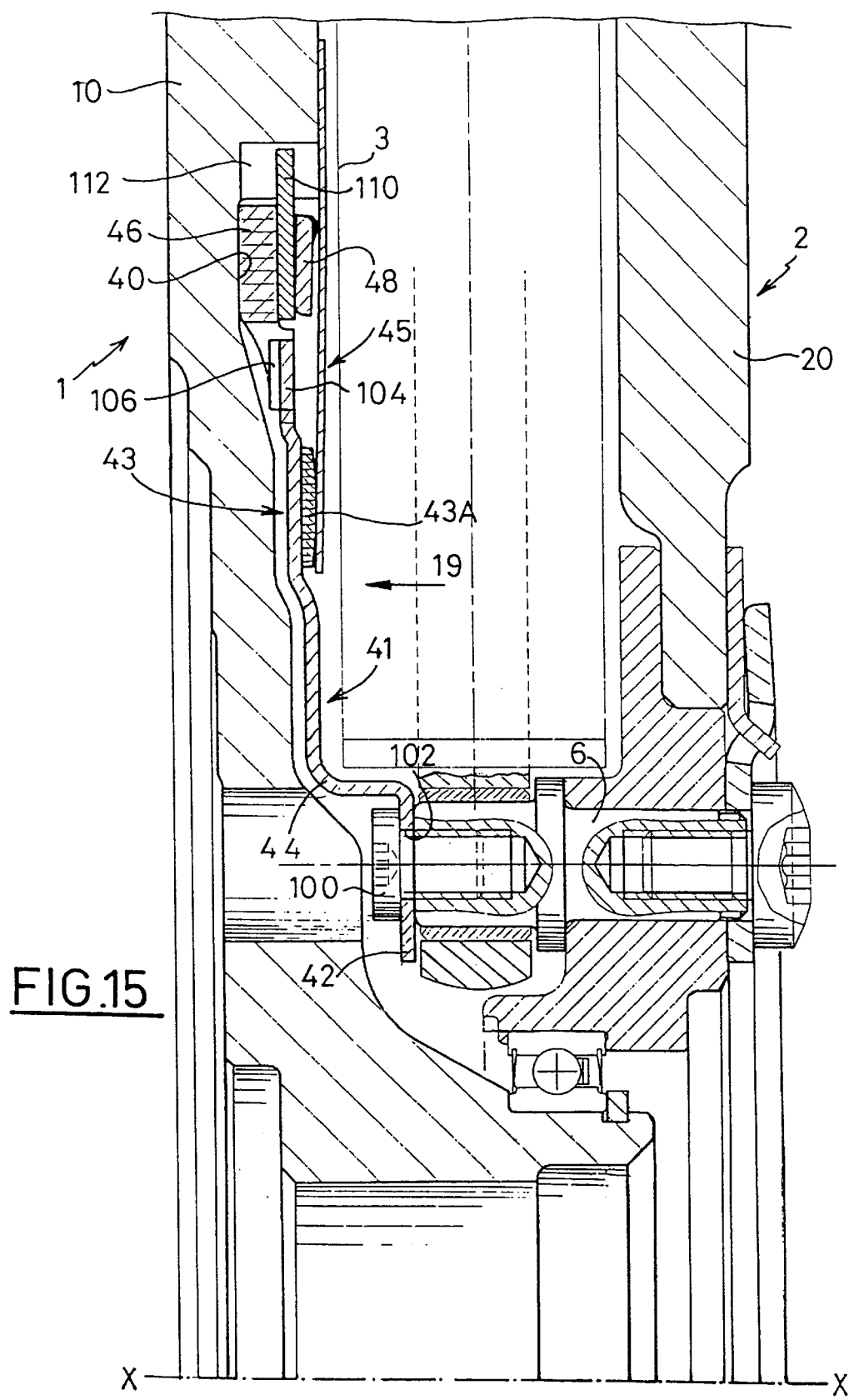
FIGS. 15 and 16 are views on a larger scale showing the upper and lower parts of FIG. 13, respectively.
Figure 16:
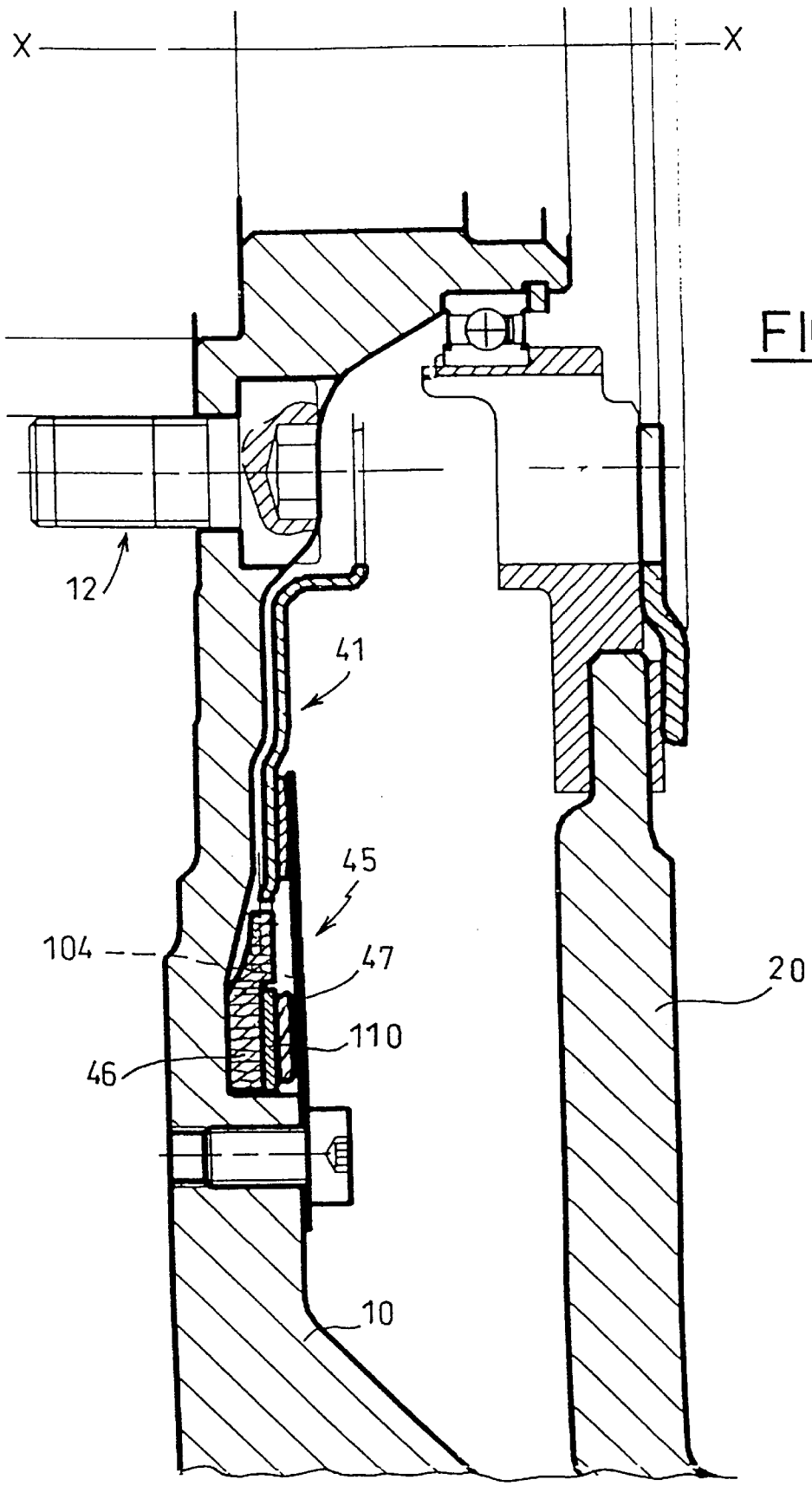
Figure 17:
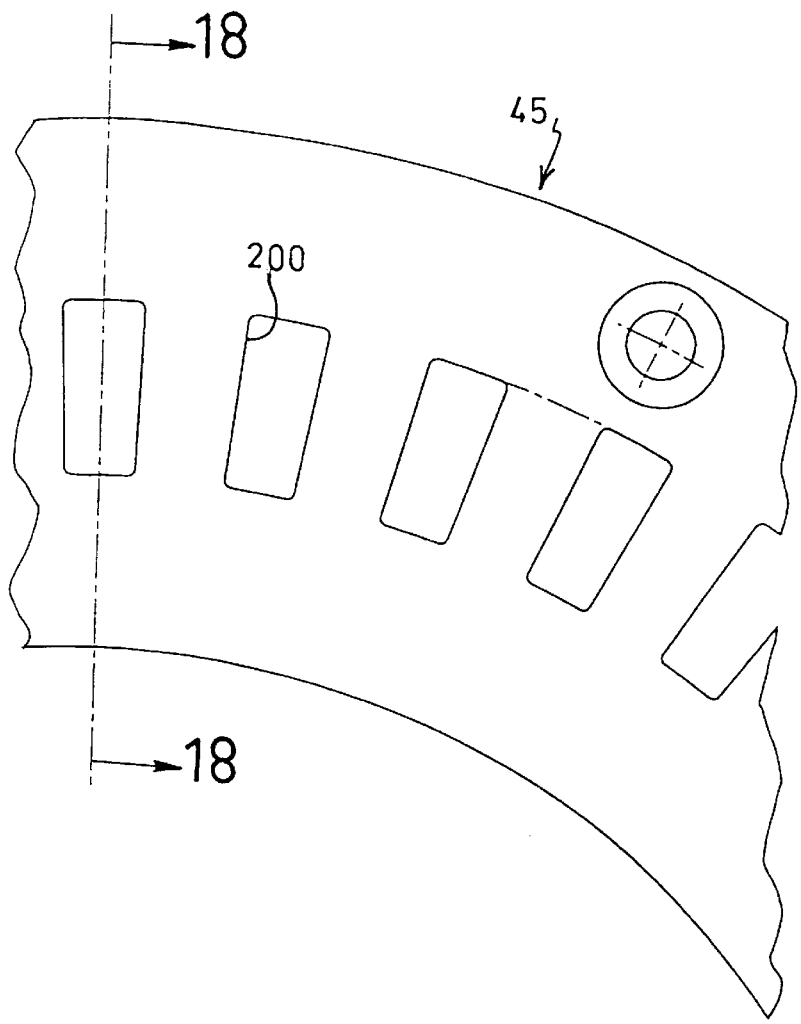
FIG. 17 is a view on a larger scale of part of the closure ring in the second embodiment.
Figure 18:
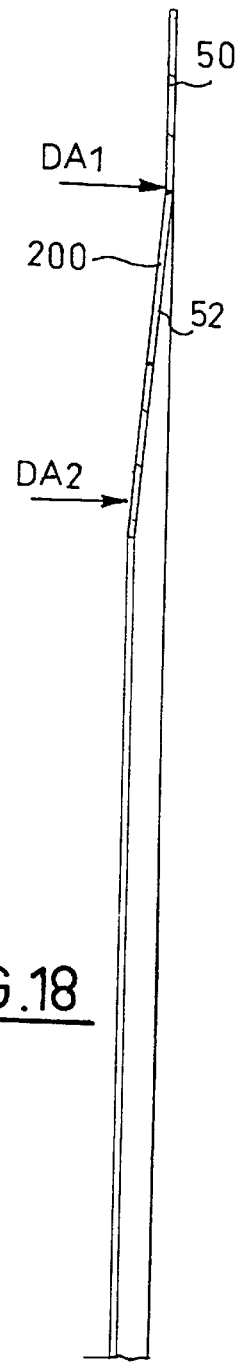
FIG. 18 is a view in cross section taken on the line 18—18 in FIG. 17.
Figure 23:
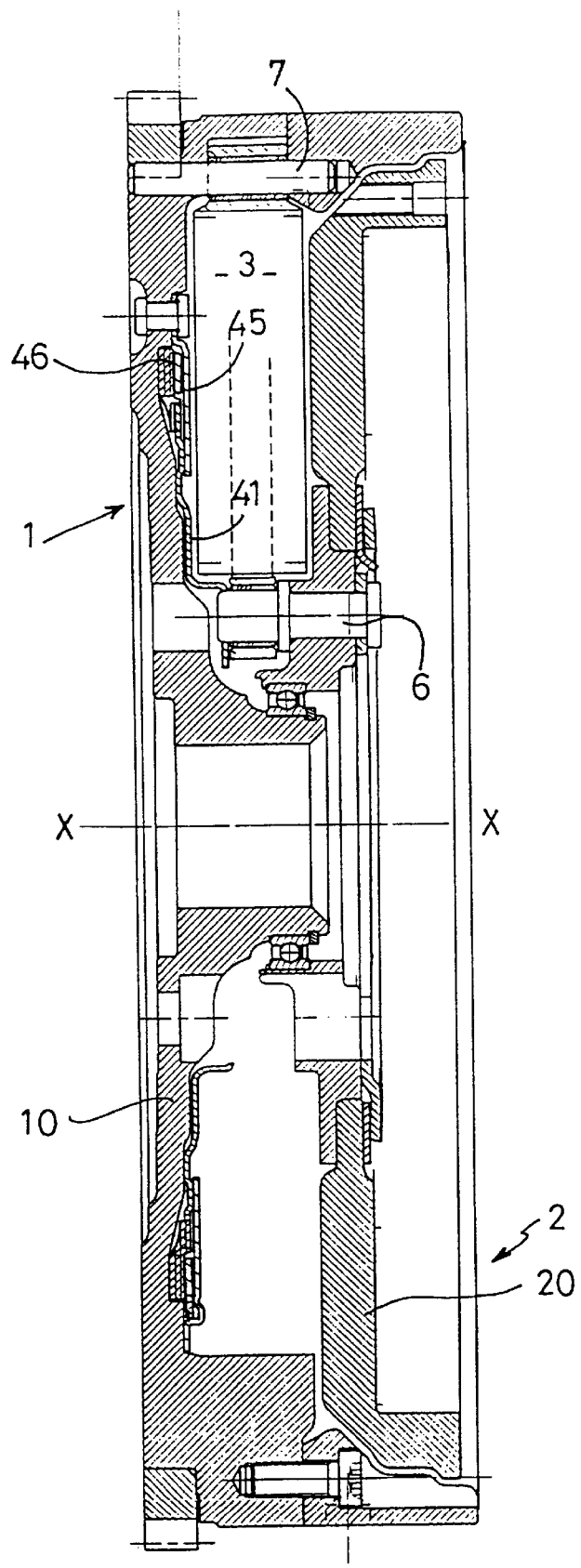
FIGS. 23 and 24 are views similar to those in FIGS. 13 and 14 but showing a modified version of the second embodiment of the friction means.
Figure 24:
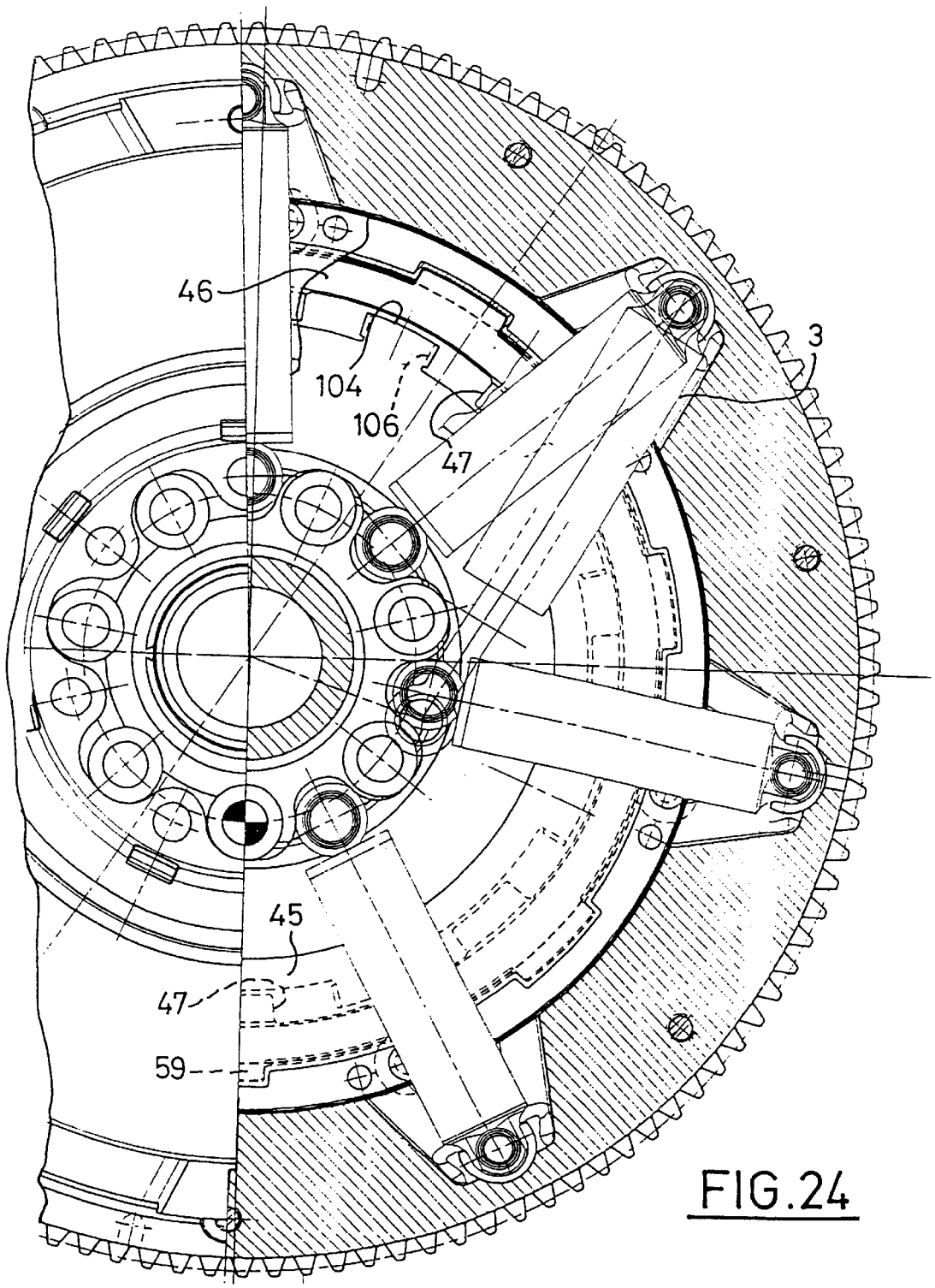
Figure 25:
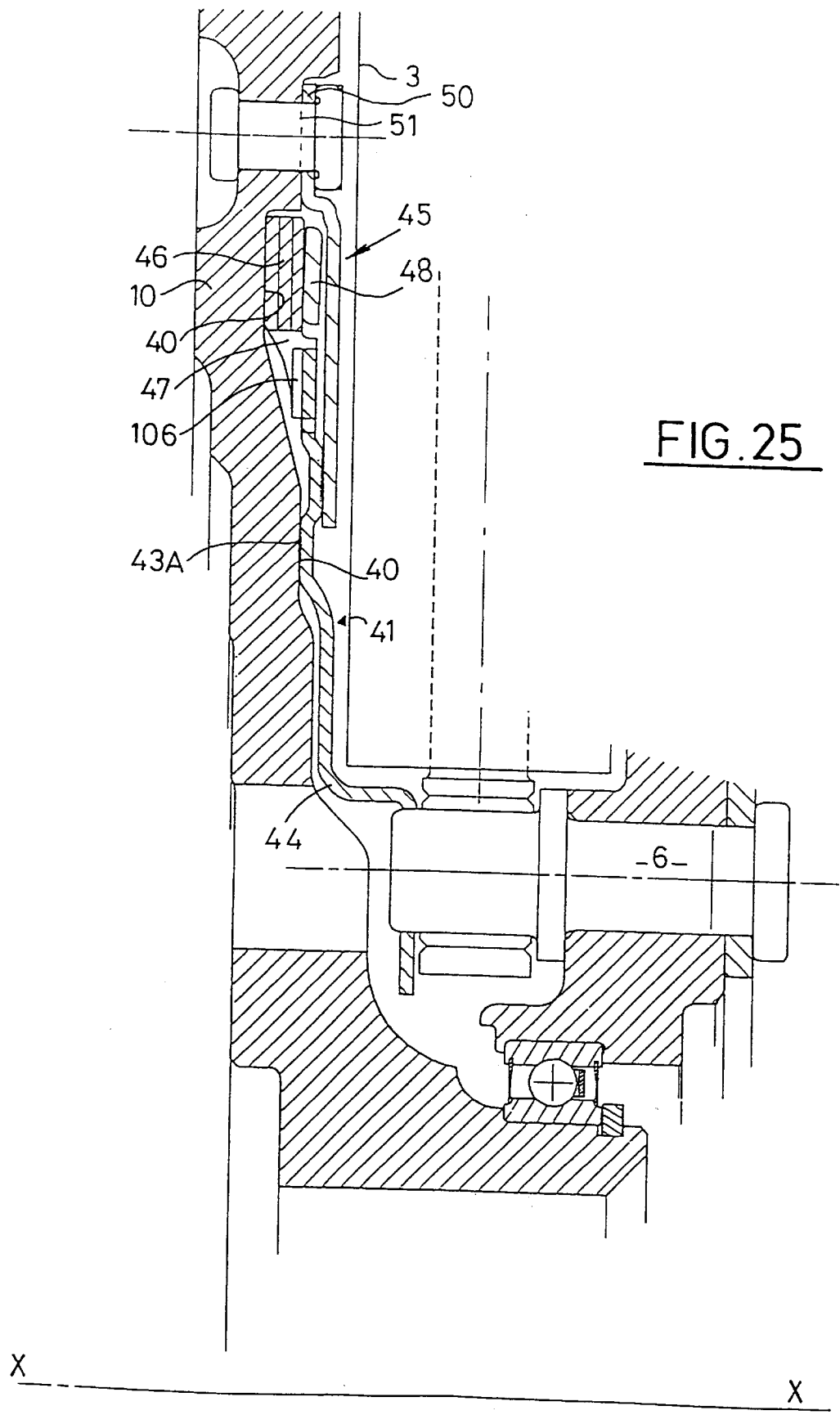
FIG. 25 is a detail view on a larger scale of the upper part of FIG. 23.

In FIGS. 14 and 24, the casing 31 is of tubular form, the first articulating element 35 being attached by welding on the casing 31.

What is claimed is:

1. A double flywheel, comprising two coaxial rotatable masses rotatably mounted to one another about a common axial axis of symmetry, with, interposed operatively between the two masses are a coupling means and an axially acting friction means, wherein a first one of the two masses is adapted to be coupled in rotation to a driving shaft, while the second of the two masses is adapted to be coupled in rotation disconnectably to a driven shaft, the second of the two masses including a reaction plate of a friction clutch, and is mounted for rotation on the first mass, the friction means including;

a control ring, a portion of which is arranged to engage frictionally on a friction face of the first one of the masses, and which is coupled in rotation to the second of the two masses;

a friction ring situated radially outwardly of the control ring, which meshes with the control ring with a circumferential clearance, and which is biased into contact with the friction face; and a closure ring fixed to the first one of the two masses, the control ring and the friction ring being placed axially between the friction face of the closure ring, wherein the control ring is arranged to engage frictionally on the friction face and on the closure ring, and the control ring is gripped elastically between the friction face and the closure ring.

2. A double flywheel according to claim 1, wherein the outer peripheral portion of the control ring is arranged to engage frictionally, firstly on the friction face and secondly on the closure ring, which biases the control ring through its outer periphery, the control ring (41) being gripped elastically between the friction face and the inner periphery of the closure ring.

3. A double flywheel according to claim 2, wherein the control ring has at its outer periphery two annular working friction surfaces, which are offset axially and which are arranged to engage frictionally, firstly on the friction face and secondly on the closure ring.

4. A double flywheel according to claim 2, wherein the closure ring has at its outer periphery a transversely oriented flange, for fastening the friction ring to the one of the two masses, and which is joined, by an axially oriented zone, to a generally radially oriented base, which is centrally perforated and which is inclined towards the one of the two masses in such a way that there exists, between the outer periphery of the base and the said friction face, an axial distance which is greater than the axial distance between the inner periphery of the base and the friction face.

5. A damped double flywheel according to claim 4, wherein the axial distance between the two working friction surfaces between two opposed top surfaces of the working friction surfaces of the control ring is greater than the axial distance (DA2) between the inner periphery of the base and the friction face (40).

6. A double flywheel according to claim 1, wherein the friction ring (46) is subjected to the action of an axially acting resilient ring (48) which bears directly on the closure ring (45) so as to bias the friction ring into contact with the friction face (40).

7. A damped double flywheel according to claim 6, wherein the resilient ring is fixed to the closure ring for rotation therewith.

8. A damped double flywheel according to claim 6, wherein the resilient ring (48) includes at its outer periphery inclined radial lugs which engage within press-formed projecting elements of the control ring.

9. A damped double flywheel according to claim 3, wherein the friction ring (46) has at its inner periphery lugs by means of which the lugs meshes with complementary portions of the control ring.

10. A damped double flywheel according to claim 9, wherein the working friction surfaces of the control ring are corrugations, the top surfaces of which constitute the working friction surfaces of the control ring, which are in permanent frictional contact against the friction face and against the closure ring, and the lugs of the friction ring mesh with the corrugations.

11. A damped double flywheel according to claim 9, wherein the working friction surfaces of the control ring (41) are two radially offset annular zones, and the control ring includes, radially outwardly and beyond its outer periphery, lugs which mesh with the lugs of the friction ring.

12. A damped double flywheel according to claim 1, wherein the one of the two masses is the first mass (1).

* * * * *